United States Patent
Gupta

(10) Patent No.: US 7,373,468 B1
(45) Date of Patent: *May 13, 2008

(54) CONTROL FACILITY FOR PROCESSING IN-BAND CONTROL MESSAGES DURING DATA REPLICATION

(75) Inventor: Vikas K. Gupta, Santa Clara, CA (US)

(73) Assignee: Symantec Operating Corporation, Cupertino, CA (US)

( * ) Notice: Subject to any disclaimer, the term of this patent is extended or adjusted under 35 U.S.C. 154(b) by 248 days.

This patent is subject to a terminal disclaimer.

(21) Appl. No.: 10/881,072

(22) Filed: Jun. 30, 2004

Related U.S. Application Data

(63) Continuation of application No. 10/077,330, filed on Feb. 15, 2002, now Pat. No. 6,779,093.

(51) Int. Cl.
    *G06F 12/00* (2006.01)

(52) U.S. Cl. ............... 711/162; 711/112; 711/114; 707/204

(58) Field of Classification Search ............ 711/162
    See application file for complete search history.

(56) References Cited

U.S. PATENT DOCUMENTS

| | | | |
|---|---|---|---|
| 5,155,845 A * | 10/1992 | Beal et al. | 714/6 |
| 5,440,727 A * | 8/1995 | Bhide et al. | 711/117 |
| 5,974,563 A * | 10/1999 | Beeler, Jr. | 714/5 |
| 2002/0029281 A1* | 3/2002 | Zeidner et al. | 709/230 |
| 2002/0095470 A1* | 7/2002 | Cochran et al. | 709/208 |
| 2002/0133743 A1* | 9/2002 | Oldfield et al. | 714/11 |
| 2002/0169925 A1* | 11/2002 | Achiwa et al. | 711/112 |
| 2003/0041074 A1* | 2/2003 | Vasudevan et al. | 707/204 |
| 2003/0046270 A1 | 3/2003 | Leung et al. | 707/1 |
| 2003/0217119 A1* | 11/2003 | Raman et al. | 709/219 |

* cited by examiner

*Primary Examiner*—Donald Sparks
*Assistant Examiner*—Hashem Farrokh
(74) *Attorney, Agent, or Firm*—Campbell Stephenson LLP

(57) ABSTRACT

A control facility that allows a non-programmer to use and manipulate replicated data without disrupting replication of the data itself. The control facility can be used and customized for a variety of software applications and storage platforms. These customized control facilities can enable a system administrator without application- or storage system-specific knowledge to perform off-host processing of the replicated data, such as taking snapshots of the data and running Decision Support System reports.

In response to a single user command during replication of data from a primary node to a secondary node, the following steps are performed: obtaining a control message from the primary node, wherein the control message is associated with a control command for execution on the secondary node; and automatically executing the control command on the secondary node.

24 Claims, 5 Drawing Sheets

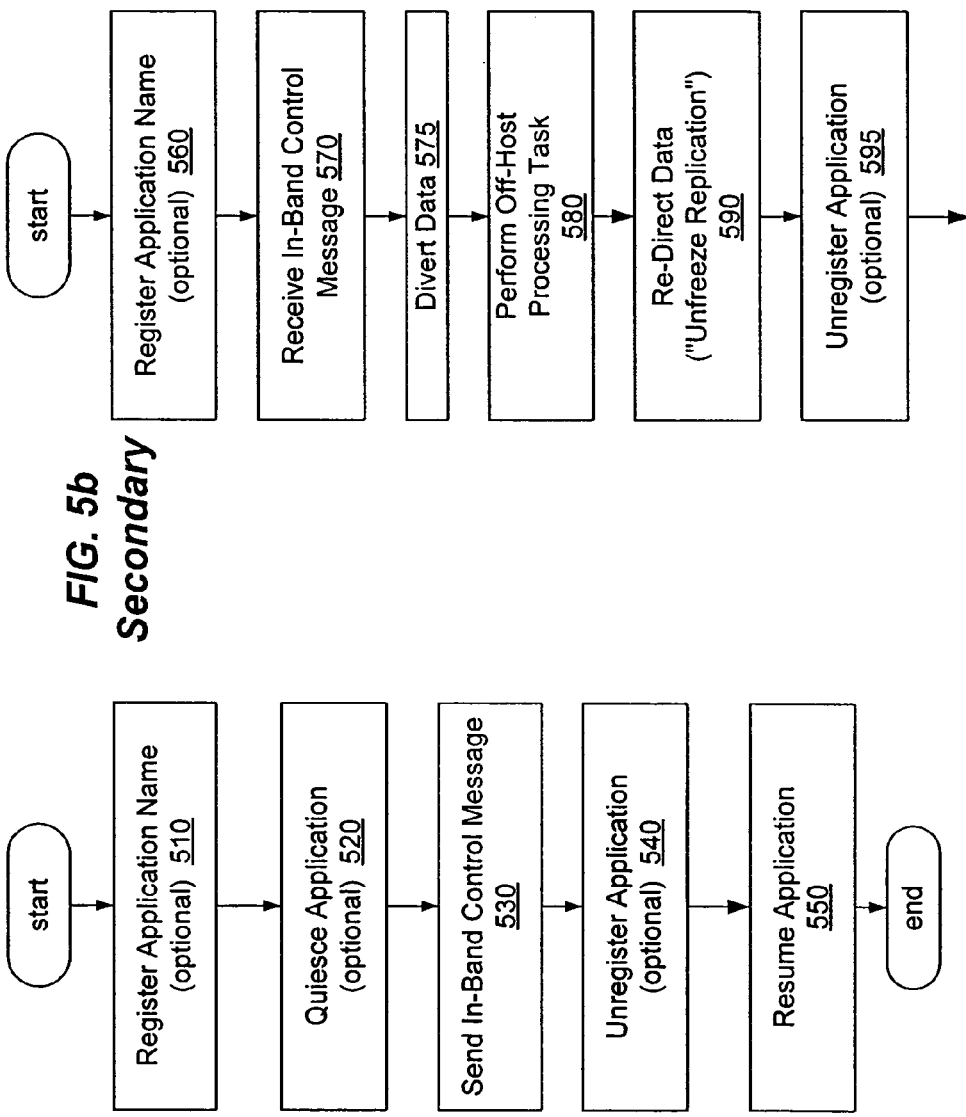
FIG. 5b Secondary
FIG. 5a Primary

CONTROL FACILITY FOR PROCESSING IN-BAND CONTROL MESSAGES DURING DATA REPLICATION

CROSS-REFERENCE TO RELATED APPLICATIONS

This application is a continuation of U.S. patent application Ser. No. 10/077,330, entitled "Control Facility for Processing In-Band Control Messages During Data Replication," filed Feb. 15, 2002 now U.S. Pat. No. 6,779,093, and naming Vikas K. Gupta as an inventor.

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

Information drives business. A disaster affecting a data center can cause days or even weeks of unplanned downtime and data loss that could threaten an organization's productivity. For businesses that increasingly depend on data and information for their day-to-day operations, this unplanned downtime can also hurt their reputations and bottom lines. Businesses are becoming increasingly aware of these costs and are taking measures to plan for and recover from disasters.

Two areas of concern when a failure occurs, as well as during the subsequent recovery, are preventing data loss and maintaining data consistency between primary and secondary storage areas. One simple strategy includes backing up data onto a storage medium such as a tape, with copies stored in an offsite vault. Duplicate copies of backup tapes may be stored onsite and offsite.

In many situations, disaster recovery requires the ability to move a software application and associated data to an alternate site for an extended period, or even permanently, as a result of an event, such as a fire that destroys a site. For these more complicated situations, strategies and products to reduce or eliminate the threat of data loss and minimize downtime in the face of a site-wide disaster are becoming increasingly available.

Replication products exist that replicate data in real time to a disaster-safe location. To accommodate the variety of business needs, these replication products should include facilities for remote mirroring of data and replicating data over a wide area or distributed network such as the Internet. Furthermore, different types of storage require different replication methods. Replication products are available for a variety of storage solutions, such as database replication products and file system replication products.

Even more complex problems arise when system administrators need to create and manage multiple copies of business-critical information across the enterprise. The ability to replicate data to remote sites is crucial for disaster recovery and the return of a distributed system to service. Although various database management systems provide some remote replication or backup facilities, a more general service is needed to replicate, for example, database metadata and non-database data, in addition to the database contents. Further exacerbating the problem, each type of storage system usually requires familiarity with specific programming languages or commands to perform backup activities, a skill not often possessed by system administrators.

What is needed is a facility that allows a non-programmer to use and manipulate replicated data without disrupting the data replication process. The facility should be useful for a variety of software applications and storage platforms and not require application- or storage system-specific knowledge in order to perform processing of the replicated data. Preferably, the facility should be easy to use and enable the user to perform multiple processing tasks.

SUMMARY OF THE INVENTION

The present invention includes a control facility that allows a non-programmer to use and manipulate replicated data without disrupting the data replication process. The control facility can be used and customized for a variety of software applications and storage platforms. These customized control facilities can enable a system administrator without application- or storage system-specific knowledge to perform off-host processing of the replicated data, such as taking snapshots of the data and running Decision Support System reports.

In one feature of the invention, a method includes performing the following in response to a single user command during replication of data from a primary node to a secondary node: obtaining a control message from the primary node, wherein the control message is associated with a control command for execution on the secondary node; and automatically executing the control command on the secondary node.

In another feature of the invention, a system includes a control facility including a control command configured to control the following during replication of data from a primary node to a secondary node: obtaining a control message from the primary node, wherein the control message is associated with a control command for execution on the secondary node; and executing the control command on the secondary node.

In yet another feature of the invention, a computer program product includes instructions to control the following during replication of data from a primary node to a secondary node in response to a single user command: instructions to obtain a control message from the primary node, wherein the control message is associated with a control command for execution on the secondary node; and instructions to execute the control command on the secondary node in response to obtaining the control message; and a computer readable medium to store the controlling instructions, the obtaining instructions, and the execution instructions.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIG. 5a is a flowchart of actions of the primary node while replicating data and sending an in-band control message.

FIG. 5b shows a flowchart of actions of the secondary node while replicating data and processing the in-bound control message.

The use of the same reference symbols in different drawings indicates similar or identical items.

Figure 1:
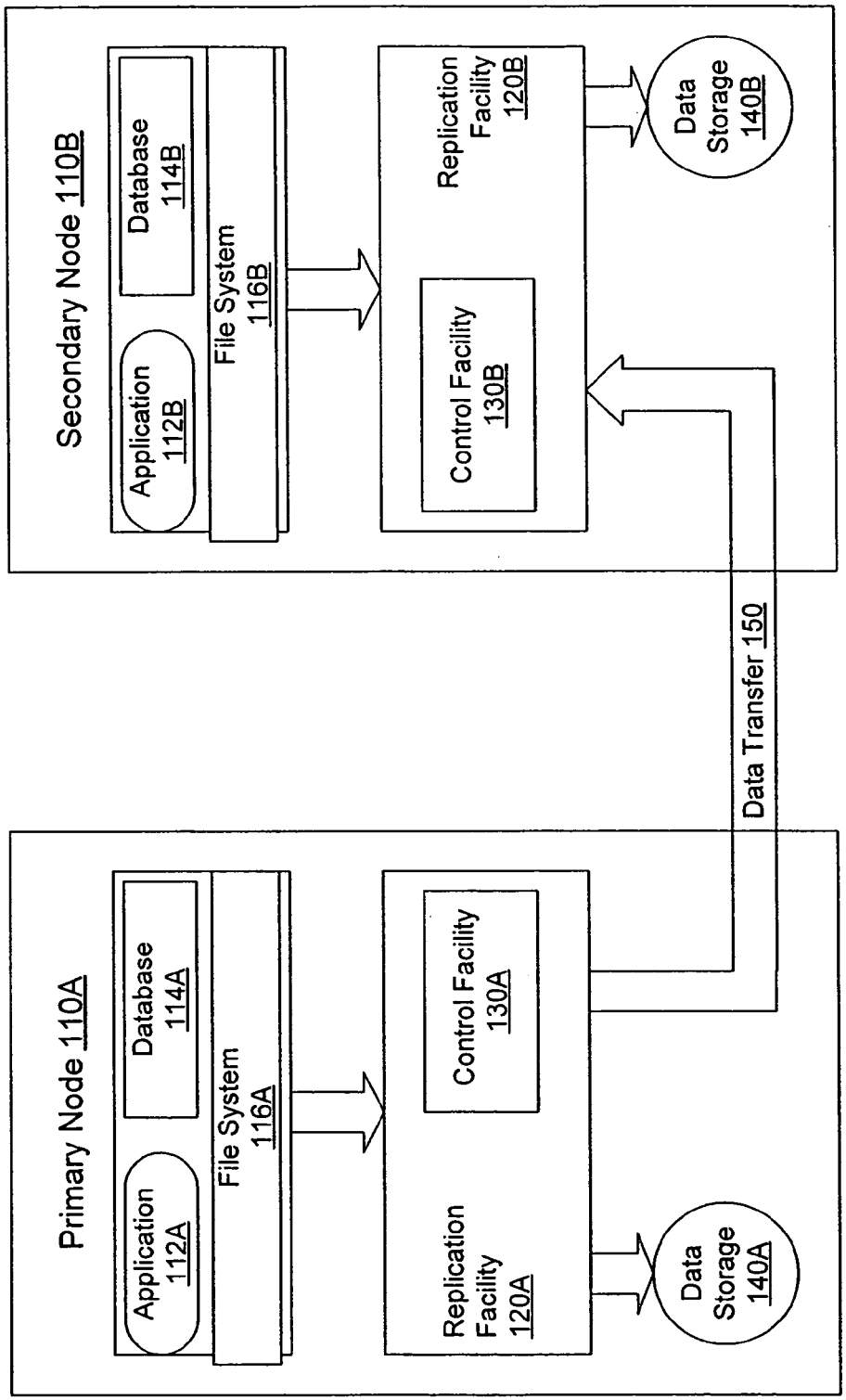
FIG. 1 shows an example of a replication system in which the present invention operates.

While the invention is susceptible to various modifications and alternative forms, specific embodiments thereof are shown by way of example in the Drawings and will herein be described in detail. It should be understood, however, that the Drawings and Detailed Description are not intended to limit the invention to the particular form disclosed. On the contrary, the intention is to cover all modifications, equivalents, and alternatives falling within the scope of the present invention as defined by the appended Claims.

DETAILED DESCRIPTION

For a thorough understanding of the subject invention, reference may be had to the following Detailed Description, including the appended Claims, in connection with the above-described Drawings.

Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Introduction

The present invention includes a control facility that allows a non-programmer to use and manipulate replicated data without disrupting the data replication process. The control facility can be used and customized for a variety of software applications and storage platforms. These customized control facilities can enable a system administrator without application- or storage system-specific knowledge to perform off-host processing of the replicated data, such as taking snapshots of the data and running Decision Support System reports.

The present invention operates in an environment in which data from a primary node are replicated to maintain a consistent copy of application data at a secondary node. Typically, a secondary node is remote from the physical location of the primary node and can be accessed via a network, although it is not a requirement that the secondary node be physically remote. Primary and secondary nodes may be implemented as computer systems that communicate using a communication link, typically over a network connecting the primary and secondary nodes to other nodes.

Data are replicated from a primary node, where an application program is running, to one or more secondary nodes. A set of data on the primary node, and its counterparts on the secondary nodes, make up a Replicated Data Set (RDS). The designations of primary and secondary nodes are used in the context of a particular Replicated Data Set (RDS).

A given node can serve as a primary node for one application program, and a secondary node for another application program. Furthermore, for the same application program, a given node can serve as a secondary node at one point in time, and later as a primary node to "cascade" replication of the data to other nodes connected via communication links. For example, a first replication may be made between network nodes in different cities or states, and a node in one of the cities or states can serve as the primary node for duplicating the data world-wide.

Each primary node can have more than one secondary node. As used herein, a reference to the secondary node implicitly refers to all secondary nodes associated with a given primary node. In all cases, unless noted, the same operations are performed on all secondary nodes.

Replication is unidirectional for a given set of data. Writes of data on the primary node are sent to the secondary nodes, but access to the data at the secondary nodes is typically read-only. If read/write access to a secondary set of data is required, (after a primary node crash, for example), replication can be halted for that set of data. If data are then written to storage areas on secondary nodes, a synchronization process can be performed when the primary node comes back up so that both sets of data are again identical before resuming replication of data.

Replication of data can be performed synchronously or asynchronously. With synchronous replication, an update is posted to the secondary node and acknowledged to the primary node before completing the update at the primary node. In the event of a disaster at the primary node, data can be recovered from the secondary node without any loss of data because the copies of the data at the primary and secondary nodes contain the same data. With asynchronous replication, updates to data are immediately reflected at the primary node and are persistently queued to be forwarded to each secondary node. Data at the secondary node can lag behind data at the primary node during peak update times. A decision whether to replicate data synchronously or asynchronously depends upon the nature of the application program using the data as well as numerous other factors, such as available bandwidth, network round-trip time, the number of participating servers, and the amount of data to be replicated.

The present invention includes a control facility that operates in conjunction with a replication facility. The replication facility performs the physical replication of data, and the control facility allows processing of the replicated data at the secondary node while the process of replicating data from the primary node is ongoing.

The replication and control facilities contribute to an effective disaster recovery plan. In the event that a data center is destroyed, the application data is immediately available at a remote site, and the application can be restarted at the remote site. The replication and control facilities can be used with existing applications having existing data, as well as with new applications as they are introduced.

An Example of a Replication System having a Control Facility

FIG. 1 shows an example of a replication system in which the present invention operates. Primary node 110A includes an application program 112A, a database 114A, and a file system 116A. Replication facility 120A can obtain data from one or more of the application program 112A, database 114A, and file system 116A, and store the data in data storage 140A. Replication facility 120A transfers data from data storage 140A to data storage 140B on secondary node 110B, as shown by data transfer 150. Data transfer 150 is typically performed over a communication link between the primary and secondary nodes.

Secondary node 110B includes corresponding copies of application 112A, database 114A, and file system 116A, respectively labeled application 112B, database 114B, and file system 116B. These respective copies can perform the functions of primary node 110A in the event of disaster. Alternatively, programs and other files associated with the application, database and file system may be stored in a data storage area on the primary node and replicated along with the data. Should the secondary node itself need to replicate data, the programs and other files can be extracted from the data at the secondary node. Corresponding copies of replication facility 120A and control facility 120A also reside on secondary node 110B, respectively replication facility 120B and control facility 130B. These copies enable secondary node 110B to perform functions similar to those performed at primary node 110A and to replicate data to its own secondary node.

A control facility, such as one of control facilities 130A and 130B, enables applications to insert application-defined control messages into the data being replicated to a secondary replication storage group. When an IBC message arrives at the secondary replication storage group, replication can be frozen until directed to unfreeze. In this way, an application can signal a secondary replication storage group that some user-defined event has occurred relative to the data, such as a point of application-level consistency. The application can therefore enable the secondary replication storage group to take some action, such as executing a control command, while replication is frozen.

Figure 2:
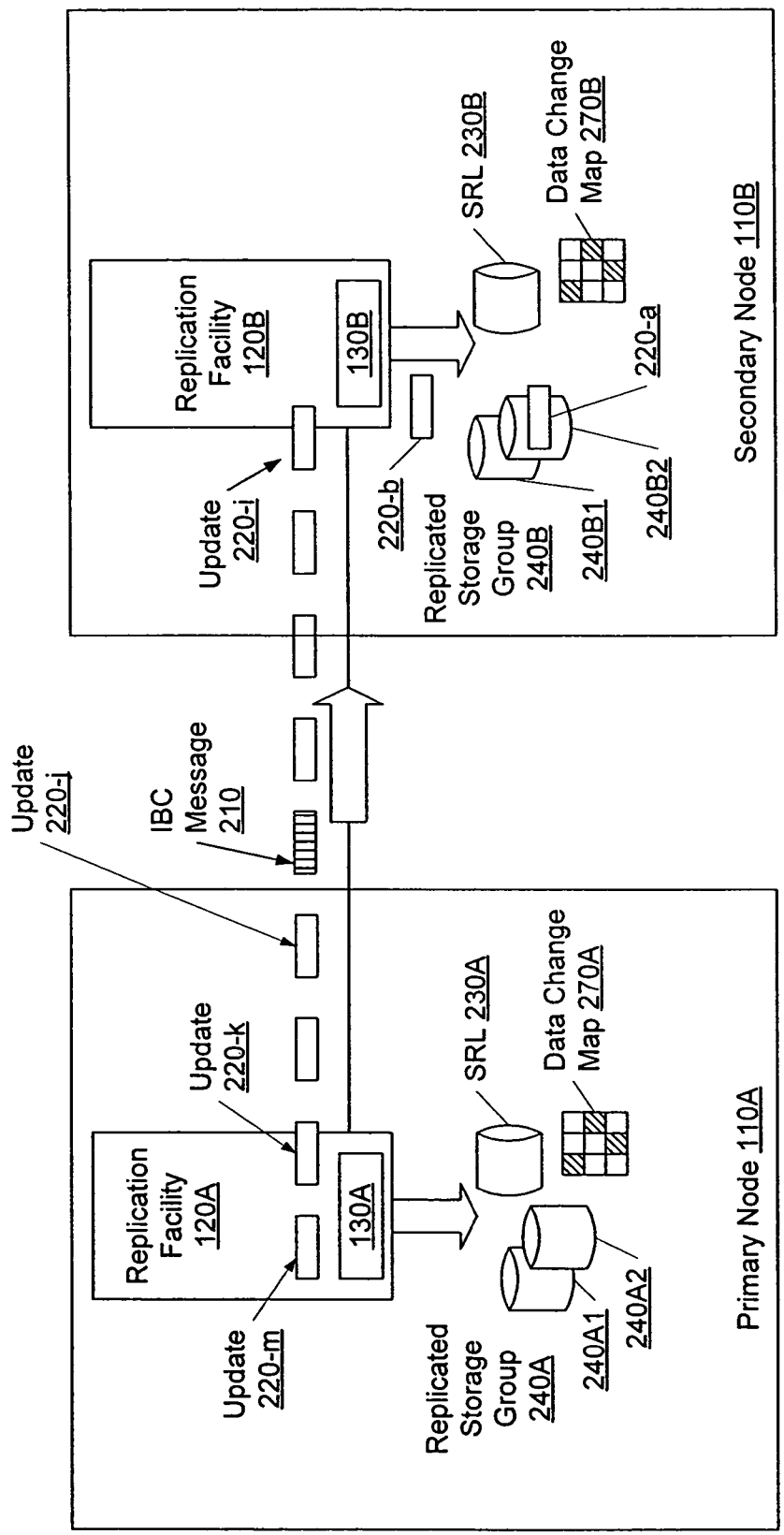
FIG. 2 shows replication of a data stream from the primary node to the secondary node of the replication system of FIG. 1.

FIG. 2 shows replication of a data stream from primary node 110A to secondary node 110B. The data stream includes multiple data units, each referred to as an update and labeled as update 220-a, update 220-b, and so on. Replication of the data stream begins when replication facility 120A of primary node 110A sends an update such as update 220-a to secondary node 110B. Replication of the data stream is completed when replication facility 120B of secondary node 110B stores the last update, such as update 220-k, on the secondary node.

Each of primary node 110A and secondary node 110B includes one or more data storage areas on which data being replicated are stored. In the example of FIG. 2, these data storage areas are storage areas 240A1 and 240A2 of primary node 110A and storage areas 240B1 and 240B2 of secondary node 110B. FIG. 2 shows a point in time during replication when update 220-a is being stored on the secondary node in data storage area 240B2. Replication facility 120B receives and processes the replication stream from primary node 110A and may also replicate its data for other secondary nodes.

Also shown in FIG. 2 is an in-band control (IBC) message, which is a message that is associated with a control command to be performed at the secondary node, possibly using replicated data at the secondary node. IBC messages, such as IBC message 210, are used to direct a secondary node to perform the control command, while the secondary node simultaneously continues to accept replicated data from the primary node. Control facility 130A of primary node 110A is used to send IBC messages to secondary node 110B. In the example of FIG. 2, IBC message 210 has been injected into the data replication stream including multiple updates, such as update 220-a. Other embodiments of the invention may include sending an IBC message separately from the data.

Upon receiving an IBC message, replication facility 120B freezes replication of the data from primary node 110A. For example, replication facility 120B may freeze the data storage areas, such as data storage areas 240B1 and 240B2, at the secondary node 110B by diverting subsequent data received to an alternate location. Secondary node 110B continues to receive and store data from primary node 110A until processing IBC message 210 is complete. The control command associated with IBC message 210 is executed automatically when the diversion of data is established. When the control command has been executed, the portion of the data diverted to the alternate location is copied back to the data storage areas where the data were first stored.

Replication Storage Groups

A set of data storage areas that are replicated as a unit is referred to herein as a replicated storage group (RSG), such as replication storage group 240A of FIG. 2. Storage areas in a replicated storage group are under the control of an application, such as application 112A or database 114A of FIG. 1, that requires write-order fidelity among the updates to the storage areas. An application such as application 112A of FIG. 1 manages data in a primary replication storage group, such as RSG 240A. Replication facility 120A then replicates the data to one or more secondary replication storage groups, such as secondary RSG 240B, at secondary nodes. Write ordering is strictly maintained within a replication storage group during replication to ensure that each remote storage area is always consistent, both internally and with all other storage areas of the replication storage group. Storage areas that are associated with a replication storage group and contain application data are called application data storage areas.

Storage Replicator Log

In the embodiment shown in FIG. 2, each of primary node 110A and secondary node 110B also includes a storage replication log (SRL), such as SRL 230A and SRL 230B, for each replication storage group, respectively RSG 240A and RSG 240B. Updates to the data storage areas in the primary replication storage group 240A can be held in the storage replication log 230A on primary node 110A before being sent to secondary node 110B. In such an embodiment, each update to data in a replication storage group generates two write requests: one to a data storage area, and one to the storage replication log. For this reason, data storage areas and SRL storage areas are preferably configured on different physical disks to improve performance of the replication process.

In some embodiments, an SRL on a secondary node, such as SRL 230B on secondary node 110B, performs a different function than the function performed by the corresponding SRL of the primary node, here SRL 230A. Under normal operations, the secondary SRL is not used. However, when the replication system is recovering after a temporary failure in communication between the primary and secondary nodes or from a primary or secondary node failure, updates can be stored in the secondary SRL and applied together to maintain data consistency. Using the secondary SRL in this way ensures that the secondary node transitions from one consistent data state to another.

In an alternative embodiment, the secondary SRL, such as SRL 230B on secondary node 110B, can be used as the first data storage area during replication. For example, data received at the secondary node may be written first to the secondary SRL and then copied to data storage areas such as replication storage group 240B. In such an embodiment, a freeze of data on the secondary node temporarily suspends copying of the data to the data storage areas. Such an embodiment could be used, for example, to perform delayed replication.

Communication Links

In an object-oriented embodiment of the invention, communication links between the primary and secondary nodes can be represented as communication link objects (not shown in FIG. 2). Communication link objects can be associated with replication storage groups. Each communication link object on a primary replication storage group, such as RSG 240A, represents the communication link from the primary replication storage group to a corresponding secondary replication storage group, such as RSG 240B. A communication link object on a secondary replication storage group represents the communication link from the secondary replication storage group to the corresponding primary replication storage group. A secondary node typically serves as a replication node for only one primary and typically has one associated communication link object referencing its primary node. A primary replication storage group can have one or more associated communication link objects for its secondary nodes. If a secondary node is "promoted" to assume the role of a primary node, then the newly-promoted node can have multiple communication link objects for other nodes that were previously secondary to the "demoted" primary node.

A primary communication link object reads data from the corresponding storage replication log (SRL) at the primary node and sends the data to the secondary node. Communication link objects in an replication storage group share the SRL at the primary node, and each communication link object reads data at its own rate. An update is removed from the SRL when all the communication link objects have successfully sent their respective updates to the secondary nodes. If a communication link object cannot store updates as quickly as they arrive, the communication link object may overflow and a precautions are taken to avoid losing the data that overflows.

As mentioned above, replication of data can be performed in synchronous or asynchronous mode. The mode of replication can be set up for each communication link object, depending on the requirements for the specific application. Communication link objects in a replication storage group can be set to replicate in different modes.

Using the control facility, users can select the behavior on delivery of an IBC message at a communication link. For example, an IBC message may cause any previous update activity to be flushed before the IBC message is delivered. The communication link may then be used to selectively proceed immediately to the next updates in the replicated data, or to freeze activity until released by the application.

A typical use of IBC messages is to checkpoint application-level consistency within a replicated storage area. An application running on the primary node can insert an IBC message that will freeze the data into the update stream at a point at which the application considers the primary data storage area content to be consistent.

Data Change Map

Also in an object-oriented embodiment of the invention, a data change map (DCM) can be employed. A DCM is an object that contains a bitmap, and can be optionally associated with a data storage area on the primary replication storage group. Examples of data change maps are shown in FIG. 2 as DCM 270A and DCM 270B. Bits in the bitmap represent ranges of data that are different between the primary and the secondary nodes.

Under normal circumstances, updates, also referred to herein as writes, are sent to the secondary node in the order in which they are generated at the primary node. Consequently, the secondary node represents a state of the primary node at a given point in time. If the secondary node takes over due to a disaster, the data storage areas will be consistent.

A DCM is used when data at the secondary node have become inconsistent with data at the primary node. While a DCM is active, each bit that has been set in the DCM represents a region of the storage area that differs in content between the primary and secondary nodes. The DCM becomes active only when updates are unable to flow between the primary and secondary nodes, and the SRL is no longer large enough to hold accumulated updates. When the updates are able to flow from the primary to the secondary node, the administrator can use the replication facility to initiate a resynchronization to incrementally synchronize the secondary node with the primary node using the bitmap. Data at the secondary node are inconsistent between the time the DCM resynchronization starts and completes, because write-order fidelity is not preserved. After the resynchronization is complete, the secondary replication storage group is consistent and replication can resume as usual.

A DCM can be used to handle overflow of a storage replication log so that replicated data are not lost. Each data storage area in the replication storage group must have a valid DCM associated with that replication storage group before the DCM can be used.

To ensure disaster recovery, data loss must be prevented and consistent data maintained even if hardware or software failures occur. A replication storage group should not be allowed to enter a state in which the failure of the network or the primary node would leave that replication storage group in an inconsistent and unusable state. During normal operation, data loss can be prevented by logging all writes to the primary SRL and ensuring that this operation completes before attempting any writes to the primary and secondary data storage areas. Following this plan ensures that the Primary SRL contains the true contents of the replication storage group. In most cases of failure, the primary SRL can be used to establish the correct contents of all data storage areas.

Data consistency is ensured by coordinating operations such that they occur in the same order on each secondary node as on the primary node. The primary SRL is time-ordered and contains the data for each individual update. Consequently, disk modifications occur in the same order on both the secondary and the primary node. If a primary or secondary node crashes, recovery includes locating the last primary SRL entry that had not yet been acknowledged by the secondary node as having been successfully written, before the crash. Operation can continue from that point. However, a window of requests may exist between the last acknowledged request and the last request that was sent to the replication storage group before the crash. The data in this window may or may not have been written to the secondary node data storage areas. To ensure the consistency of the secondary node, all the requests that were made during this window can be written as a single atomic unit, referred to as an atomic write. No read requests are allowed on the secondary node until the atomic write is complete. This requirement ensures that no application can access the replication storage group while its state is inconsistent.

Off-Host Processing

Off-host processing includes performing operations on application data on a computer system (host) other than the primary node where the application updating the data is running, such as a secondary node. Typical operations include Decision Support Systems (DSS) data extraction and reports, backup, and trial failover. Off- host processing reduces the load on the application server, which is the primary node, and uses the under-used processing power of the secondary node.

To use the replicated data on the secondary node, a snapshot can be made of each storage area in the replication storage group and the operation can be performed on the snapshot. The term off-host processing is used to describe performing operations on application data on a primary node (host) other than the primary node where the application updating the data is running, such as a using replicated data on the secondary node. Off-host processing can be done while replication is in progress. Off-host processing is described further with reference to FIGS. 3 and 4.

Figure 3:
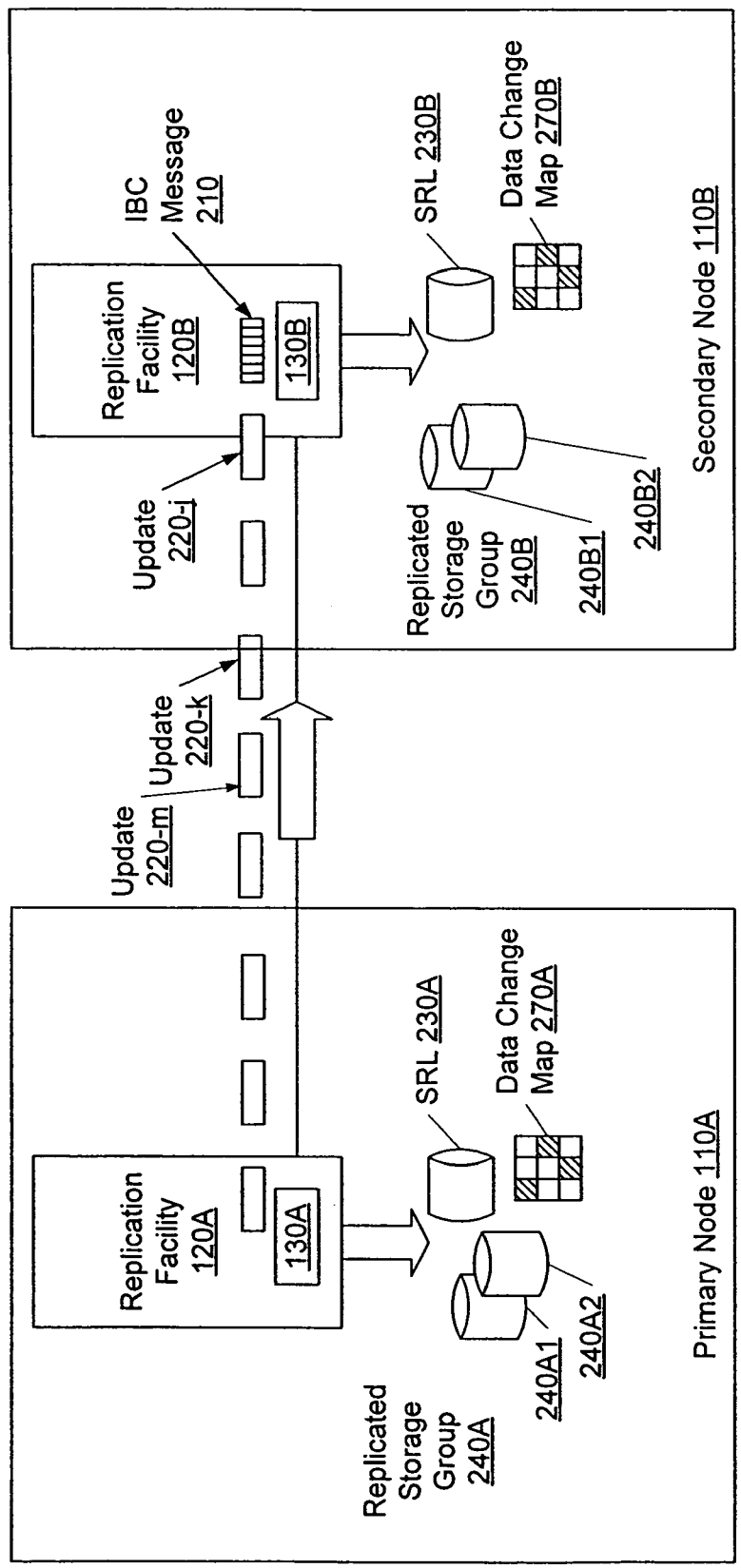
FIG. 3 shows the arrival of an in-band control message at the secondary node of FIGS. 1 and 2.

FIG. 3 shows the arrival of an in-band control (IBC) message, such as IBC message 210 of FIG. 2, at secondary node 110B. An IBC message is also referred to herein as a control message. When control facility 130B receives IBC control message 210, processing resources of the secondary node are used to execute a control command. The control command may be provided with the control message, a given control message may be associated with a corresponding control command, or a user may be prompted by control facility 130B at the secondary node to provide a control command to be executed. An examples of a possible function of a control command is to instruct the secondary node to produce a snapshot of the secondary data storage areas for running Decision Support System data extractions or reports.

While the control command is being executed, secondary node 110B continues to receive replicated data from primary node 110A. However, rather than storing the data into replicated storage group 240B, the data are diverted to secondary node SRL 230B. Data replication can continue without disruption while the control command is being executed.

Figure 4:
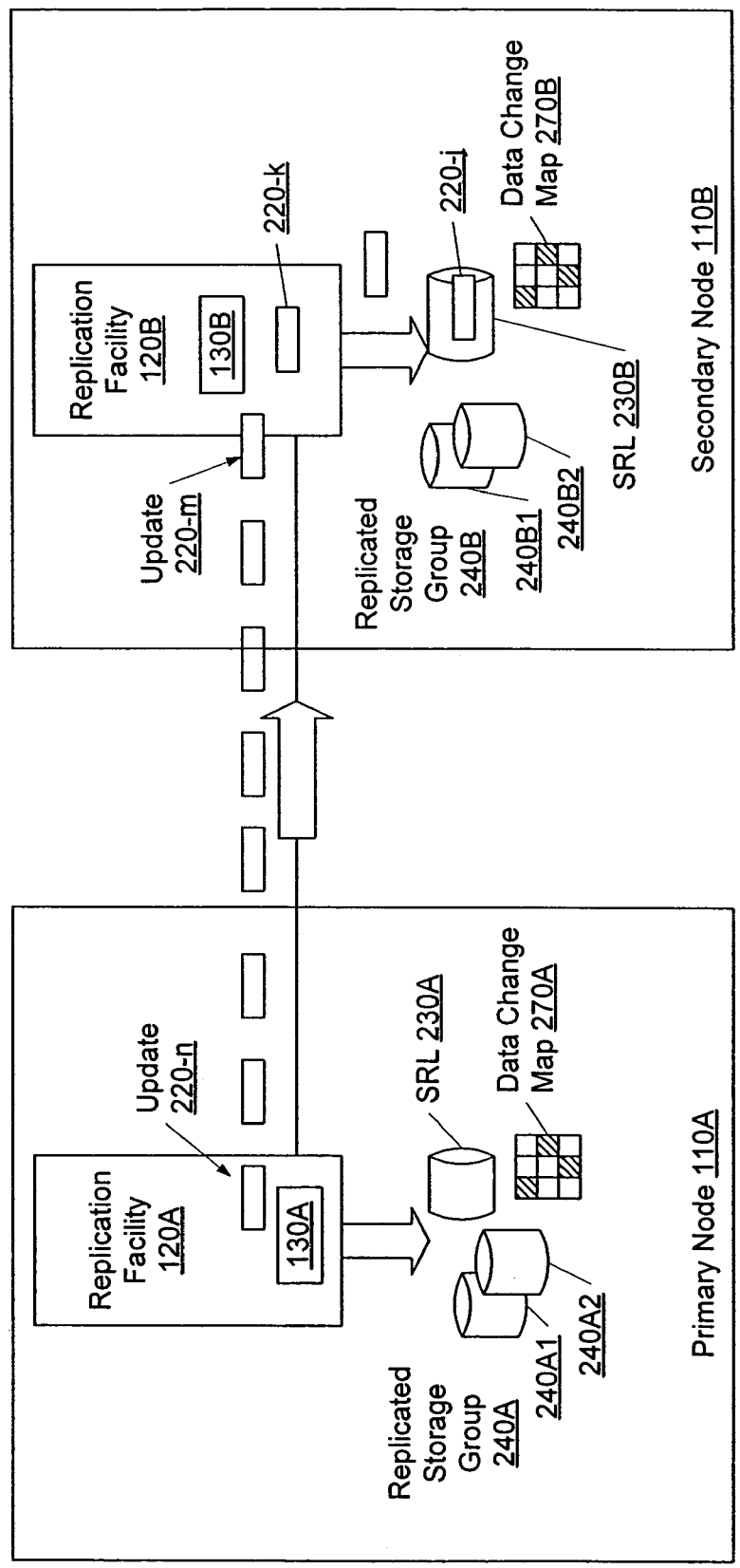
FIG. 4 shows the diversion of replicated data at the secondary node while the in-band control message is processed.

FIG. 4 shows the diversion of replicated data at the secondary node while the in-band control message is processed. For example, updates 220-*j* and 220-*k* arrive at secondary node 110B. Upon arrival, updates 220-*j* and 220-*k* are diverted to SRL 230B. No updates to replication storage group 240B are made. Diversion of the data can occur until the control command has completed execution. If, for example, the control command completes execution immediately after the arrival of update 220-*k*, subsequent updates such as update 220-*m* are re-directed back to RSG 240B. The actions taken at the primary and secondary nodes during and after processing the control command are described further with reference to FIGS. 5*a* and 5*b*.

Actions Taken at the Primary and Secondary Nodes

FIG. 5*a* is a flowchart of actions taken at the primary node while replicating data and sending an in-band control message. In a preferred embodiment of the invention, control facility 130A provides a single user command to perform all of the steps shown in one or both of FIGS. 5*a* and 5*b*. In other embodiments, control facility 130A may provide a user command interface so that the system administrator can issue one or more user commands to perform each step shown in FIG. 5*a*. The system administrator must log in to each of the primary node and the secondary node to issue the user command to perform the steps shown in FIGS. 5*a* and 5*b*.

In one embodiment of the invention, a registration process is included so that a secondary node accepts in-band control messages only from registered applications, although such registration is not required for operation of the invention. In optional Register Application Name step 510, the primary node registers the name of the application running on the primary that is expected to send an IBC message to the secondary node.

In optional Quiesce Application step 520, the registered application program is quiesced so that the data on the primary node reach a stable state before the IBC message is sent. When the IBC message reaches the secondary node, the data on the secondary node should be at the same stable state and ready for off-host processing to be performed. While reaching a stable state is desirable before performing off-host processing, quiescing data is not required for operation of the invention.

As an example, assume that the application program is a database application running on the primary node and updating a database such as database 114A of FIG. 1. The step to quiesce the application before sending an IBC message to the secondary node may vary according to the database. In most situations, data are flushed from the database cache to the storage area on which the database data are stored. For example, if the database is Oracle, log files can be switched to flush cached data to data storage. If the database is Sybase, a database checkpoint can be created to flush its cache to the data storage areas.

In the case of a file system using the primary data storage areas, the file system may need to be frozen and its buffers flushed to a data storage area. For example, this can be accomplished using a file system or operating system native command, such as the sync command for UNIX. The UNIX sync command flushes the previously unwritten file system buffers to the data storage areas. In other file systems, there may be no need to flush buffers.

In Send In-Band Control Message step 530, the in-band control message is sent to the secondary node. The control command to be executed by the secondary node may be included within or determined using the control message. As mentioned above, the in-band control message may be intermingled with updates to the data stream being replicated, or the IBC message may be sent separately.

In optional Unregister Application step 540, the application is removed from the registry of applications from which the secondary node will accept a control message. Removing the application from the registry can, for example, free memory that is allocated for the application.

In Resume Application step 550, the application is resumed to perform updates to the data at the primary node. To resume a database application on the primary node after sending the IBC message, usually no action is necessary because the only action to quiesce was to flush the database cache to a data storage area.

If the file system on the primary node was frozen to quiesce input and output to the data storage areas before the IBC message is sent, then the file systems can be unfrozen immediately after sending the IBC message and made available for access. A snapshot of the data may then be performed.

FIG. 5*b* shows a flowchart of actions of the secondary node while replicating data and processing the in-bound control message. In optional Register Application Name step 560, the secondary node registers the application name as an application from which the secondary node expects to receive control messages. The same application name should be registered with both the primary and secondary nodes.

In Receive In-Band Control Message step 570, the IBC message is received at the secondary node. Upon receiving the IBC message, Divert Data step 575 is performed and replicated data are diverted from data storage areas, such as data storage areas 240B1 and 240B2, to an alternate location, such as SRL 230B.

In Perform Off-Host Processing Task step 580, the control command associated with the control message is executed by the secondary node. Replicated data continue to be received and placed in the alternate location while the control command is executed. While replicated data are diverted on the secondary node, a snapshot can be taken and the snapshot made available for access after checking the file system, using, for example, the UNIX fsck command.

In Re-Direct Data ("Unfreeze Replication") step 590, data are copied from the alternate location, such as SRL 230B, back to the data storage areas, such as data storage areas 240B1 and 240B2. Subsequent received data is replicated to data storage areas 240B1 and 240B2. In optional Unregister Application step 595, the secondary node can remove the application from the registry, having received the expected control message.

Control Facility Details

In one implementation of a replication system, the replication facility may support a special set of application program interfaces (APIs) for accessing the control facility. These APIs enable an application to register with the control facility, send and receive IBC messages, and unregister from the control facility. However, because using an API requires some programming knowledge, APIs are typically not usable by system administrators who are unable to write programming code to use the APIs.

For example, a replication facility may provide the following APIs: IBC_REGISTER, IBC_SEND, IBC_RECEIVE, IBC_UNFREEZE, and IBC_UNREGISTER. An example of the programming code for calling each API is given below:

int ioctl (int fd, int cmd, void *arg)

The argument fd is the file descriptor obtained by opening the replication storage group device using an open system call. The value of cmd is a command code corresponding to one of the APIs IBC_REGISTER, IBC_SEND, IBC_RECEIVE, IBC_UNFREEZE, and IBC_UNREGISTER. The parameter arg is a pointer to a structure containing the arguments that for the IBC operation being requested.

For the IBC_REGISTER API, an example of an argument structure is provided below:

struct ibc_register args
char application-name[NAME SZ]
int deliver-timeout

The argument deliver-timeout specifies a time-out value in seconds for delivery of an IBC message after the IBC message has arrived at the secondary replication storage group. When the timeout expires, the secondary replication storage group can discard the IBC message and continue replication.

In another implementation, a user command interface may be provided that enables a user to use individual commands to perform tasks such as the following: register an application name, display the registered application name for an replication storage group, receive an IBC message, send an IBC message, unfreeze the secondary replication storage group, and unregister an application name.

For example, a receive IBC message user command can be used by a user to receive an IBC message at the secondary node. An example of a receive IBC message user command is given below:

vxibc -g diskgroup [-n | -R receive-timeout] [-f filename] [-I buf_length]

receive application-name replication-storage-group-name

In one implementation, the default behavior for the receive IBC message operation is to block until an IBC message is received. The option -n makes the receive operation non-blocking, such that the receive operation returns if there is no message to receive. If the receive IBC message operation succeeds, the received IBC message can be displayed to the user via the user command interface or written to a file.

In a preferred embodiment of the invention, receiving and processing an IBC message can be performed using a single user command. For example, a regrecv user command may be used to perform the following operations in a single step: register an application name, receive an IBC message, execute a control command associated with the control message with the provided arguments passed as command-line arguments to the regrecv command, unfreeze the secondary replication storage group, and unregister the application name.

The format of the single user command, regrecv, to receive and process an IBC message is given below:

vxibc -g diskgroup [-n | -R receive-timeout] [-f filename] [-1 buf_length]

regrecv application-name replication-storage-group-name control-command

As another example, a regsend command performs the following operations in a single step: registering an application name, sending an IBC message; and unregistering the application name. An example format for the regsend user command is provided below:

vxibc -g diskgroup [-D deliver-timeout] [-N | -F freeze_timeout]

[-f filename | -m message] regsend application-name replication-storage-group-name The examples below show how to use the user command interface using the individual user commands and the control facility, without and with the regsend and regrecv commands. These examples use the application name dss_app for sending and receiving IBC messages, assume that a snapshot can be created for each storage area, and assume that the following configuration has been established on the primary and secondary nodes.

| | |
|---|---|
| Name of the primary node: | Seattle |
| hrdg | Disk group |
| hr-replication-storage-group | Primary replication storage group |
| hr_london_rlk | Primary communication link for secondary node London |
| hr_dv01 | Primary data storage area #1 |
| hr_dv02 | Primary data storage area #2 |
| hr_srl | Primary SRL storage area |
| Name of the secondary node: | London |
| hrdg | Disk group |
| hr-replication-storage-group | Secondary replication storage group |
| hr-Seattle-rlk | Secondary communication link for primary node Seattle |
| hr_dv01 | Secondary data storage area #1 |
| hr_dv02 | Secondary data storage area #2 |
| hr_srl | Secondary SRL storage area |

Without using the regsend and regrecv user commands, the following steps are performed by the user using the user conunand interface:

1. On the primary node, register the application name dss_app by issuing the user command below:

vxibc register dss_app hr-replication-storage-group

2. On the secondary node, register the application name dss_app:

vxibc register dss_app hr-replication-storage-group

3. On the secondary node, prepare to receive the IBC message.

vxibc receive dss_app hr-replication-storage-group

The secondary node receives the IBC message after the updates prior to the IBC message on the primary node have been applied on the secondary node. Replication freezes when the secondary node receives the IBC message.

4. Put the application that is using the primary data storage area hr_dv01 into hot-backup mode.

5. Send the IBC message by typing the following command on the primary node:

vxibc send dss_app hr-replication-storage-group hr-london-rlk

6. On the primary node, unregister the application name dss_app:

vxibc unregister dss_app hr-replication-storage-group

7. On the primary node, resume the application by taking it out of the hot-backup mode.

8. On the secondary node, break off the snapshot from the data storage area. The snapshot command creates the snapshot storage area with the default name SNAP -hr_dv01 from the storage area hr_dv01. The user can specify the name of the snapshot storage area using the command:

vxassist snapshot hr_dv01 hr_dv01_snap
    # vxassist snapshot hr_dv02 hr_dv01_snap This command creates storage areas hr_dv01_snap and hr_dv02_snap from the storage areas hr_dv01 and hr_dv02.

9. Allow updates on the primary data storage area to be applied to the secondary data storage area by unfreezing replication:

vxibc unfreeze dss_app hr-replication-storage-group

10. Unregister the application name dss_app on the secondary node:

vxibc unregister dss_app hr-replication-storage-group

11. On the secondary node, use the snapshot data storage areas hr_dv01snap and hr_dv01_snap for off-host processing.

12. On the secondary node, resynchronize and reattach the snapshot back to the data storage areas hr_dv01 and hr_dv02 using the following commands:

vxassist snapback hr_dv01_snap
    # vxassist snapback hr_dv02_snap

The snapback destroys the snap storage areas and reattaches the snapshot to its original storage areas.

The above process is cumbersome and error-prone for a system administrator unfamiliar with the individual user commands. A single user command provided by the control facility enables the user to accomplish all of these tasks with a single user command or mouse click.

For most uses of IBC messages, the single user commands regsend and regrecv can perform the necessary tasks. The user can use the regsend command on the primary node to send an IBC message to notify the secondary node that the primary node is consistent at the application level. On the secondary node, the user can use the regrecv command and specify the control command to perform on the secondary node, such as a snapshot control command. To correlate an IBC message between the sender and the receiver, the user can provide an application name as a character string. With an IBC message, the sender is the primary node and the receiver is the secondary node.

On the secondary node, the user could either type or use an icon provided by the control facility to execute the following command:

vxibc -g diskgroup regrecv application-name replication-storage-group-name control-command where application-name is a name that the user can choose, replication-storage-group-name is the name of the replication storage group, and control-command is the control command to execute when the IBC message arrives.

On the primary node, the user can use the following user command, perhaps by clicking an icon, when the application is consistent:

vxibc -g diskgroup regsend application- name replication-storage-group-name communication-link-name In this command, the application name is the same as the one used when entering the regrecv command. The communication link name is needed only if the replication storage group contains more than one communication link, and the IBC message can be sent to a particular communication link.

One of ordinary skill in the art will recognize that many tasks can be accomplished using a control facility that provides a single user command combining multiple other user commands. In addition, one of skill will recognize that the methods described with reference to the foregoing Figures can be implemented using a computer system or a network of computer systems.

The advantages of the present invention include a control facility that allows a non-programmer to use and manipulate replicated data without disrupting replication of the data itself. The control facility can be used and customized for a variety of software applications and storage platforms. These customized control facilities can enable a system administrator without application- or storage system-specific knowledge to perform off-host processing of the replicated data, such as taking snapshots and running Decision Support System reports.

The control facility described herein may be used for any type of off-host processing. In particular, the control facility can be used in conjunction with database management systems such as Oracle, Sybase, Informix, DB2, and SQL Server; backup products such as VERITAS Netbackup and IBM Tivoli; mail servers such as Microsoft Exchange; file systems such VERITAS file system (VxFS), UNIX file system (UFS), journal file systems (JFS and J2FS), extent file system (ext2FS), and Windows NT file system (NTFS); web servers such as Internet Information Server, Netscape Enterprise Server, WebLogic, iPlanet, and Apache; other versioning products; or any other application.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments shows different components contained within other components (e.g., the control facility 130A is shown as a component of replication facility 120A). It is to be understood that such depicted architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
performing the following during replication of data from a primary node to a secondary node:
obtaining a control message from the primary node, wherein
the control message is inserted at the primary node into a replication update stream, which comprises a plurality of updates to be stored on the secondary node; and
the control message is associated with a control command;
inhibiting replication of the data at the secondary node, in response to obtaining the control message from the primary node; and
automatically executing the control command on the secondary node, subsequent to inhibiting replication.

2. The method of claim 1 further comprising:
automatically diverting a portion of the data from a first data storage area associated with the secondary node to a second data storage area associated with the secondary node in response to the obtaining the control message;
automatically copying the portion of the data from the second data storage area to the first data storage area in response to completing the execution of the control command; and
automatically re-directing the data to the first data storage area in response to completing the copying.

3. The method of claim 1 further comprising:
determining the control command associated with the control message by performing at least one of a group consisting of the following:
accessing the control command as a part of the control message;
using an association between the control message and the control command;
using a parameter from the control message to build the control command; and
prompting a user for the control command.

4. The method of claim 1 wherein
the data are stored in a data storage area corresponding to at least one of a group consisting of the following:

a database;
a file system; and
a data storage area associated with an application program.

5. The method of claim 1 further comprising: registering a first application with the primary node and the secondary node; and verifying that the control message is associated with a registered application prior to executing the control command.

6. The method of claim 1 wherein the control message is inserted into the replication update stream by an application.

7. A system comprising:
a control facility, wherein during replication of data from a primary node to a secondary node, the control facility is configured to cause the secondary node to:
 obtain a control message from the primary node, wherein the control message is inserted at the primary node into a replication update stream. which comprises a plurality of updates to be stored on the secondary node; and
 the control message is associated with a control command;
 inhibit replication of the data at the secondary node, in response to obtaining the control message from the primary node; and
 execute the control command on the secondary node, subsequent to inhibiting replication.

8. The system of claim 7 wherein
the control facility is further configured to cause the secondary node to:
 divert a portion of the data from a first data storage area associated with the secondary node to a second data storage area associated with the secondary node in response to obtaining the control message;
 copy the portion of the data from the second data storage area to the first data storage area in response to completing the execution of the control command; and
 re-direct the data to the first data storage area in response to completing the copying.

9. The system of claim 7 wherein
the control facility is further configured to cause the secondary node to:
 determine the control command associated with the control message by performing at least one of a group consisting of the following:
 access the control command as a part of the control message;
 use an association between the control message and the control command;
 use a parameter from the control message to build the control command; and
 prompt a user for the control command.

10. The system of claim 7 wherein
the data are stored in a data storage area corresponding to at least one of a group consisting of the following:
a database;
a file system; and
an application program; and
the control facility is customized for using the data in the data storage area.

11. The system of claim 7 wherein
the control facility is further configured to cause the secondary node to:
 register a first application with the primary node and the secondary node; and
 verify that the control message is associated with a registered application prior to executing the control command.

12. The system of claim 7 wherein the control message is inserted into the replication update stream by an application.

13. A system comprising:
means for controlling the following during replication of data from a primary node to a secondary node:
 means for obtaining a control message from the primary node and inhibiting replication of the data at the secondary node in response to obtaining the control message, wherein
 the control message is inserted at the primary node into a replication update stream, which comprises a plurality of updates to be stored on the secondary node; and
 the control message is associated with a control command; and
 means for executing the control command on the secondary node in response to obtaining the control message.

14. The system of claim 13 further comprising:
means for diverting a portion of the data to a second data storage area associated with the secondary node in response to the obtaining the control message, wherein the executing the control command is performed in response to completing the diverting;
means for copying the portion of the data from the second data storage area to the first data storage area in response to completing the executing the control command; and
means for re-directing the data to the first data storage area in response to completing the copying.

15. The system of claim 13 further comprising:
means for determining the control command associated with the control message; and at least one of a group consisting of the following:
means for accessing the control command as a part of the control message;
means for using an association between the control message and the control command;
means for using a parameter from the control message to build the control command; and
means for prompting a user for the control command.

16. The system of claim 13 wherein
the data are stored in a data storage area corresponding to at least one of a group consisting of the following:
a database;
a file system; and
an application program; and
the controlling means are customized to use the data stored in the data storage area.

17. The system of claim 13 further comprising:
means for registering a first application with the primary node and the secondary node; and
means for verifying that the control message is associated with a registerd application prior to executing the control command.

18. The system of claim 13 wherein the control message is inserted into the replication update stream by an application.

19. A computer program product comprising:
instructions to control the following during replication of data from a primary node to a secondary node:
 obtain a control message from the primary node, wherein the control message is inserted at the primary node into a replication update stream, which comprises a plurality of updates to be stored on the secondary node; and the control message is associated with a control command, inhibit replication of the data at the secondary node, in response to obtaining the control message from the primary node; and execute the control command on the secondary node in response to obtaining the control message; and a computer readable medium to store the controlling instructions, the obtaining instructions, and the execution instructions.

20. The computer program product of claim 19 further comprising:

instructions to divert a portion of the data to a second data storage area associated with the secondary node in response to the obtaining the control message, wherein the executing the control command is performed in response to completing the diverting;

instructions to copy the portion of the data from the second data storage area to the first data storage area in response to completing the executing the control command; and instructions to re-direct the data to the first data storage area in response to completing the copying;

and wherein the computer readable medium further stores the diverting instructions, the copying instructions, and the re-directing instructions.

21. The computer program product of claim 19 further comprising:

instructions to determine the control command associated with the control message; and at least one of a group consisting of the following:

instructions to access the control command as a part of the control message;

instructions to use an association between the control message and the control command;

instructions to use a parameter from the control message to build the control command; and instructions to prompt a user for the control command;

and wherein the computer readable medium further stores the determining instructions and the at least one of the accessing instructions, the association using instructions, the parameter using instructions, and the prompting instructions.

22. The computer program product of claim 19 wherein the data are stored in a data storage area corresponding to at least one of a group consisting of the following:

a database;

a file system; and an application program; and the controlling instructions are customized to use the data stored in the data storage area.

23. The computer program product of claim 19 further comprising:

instructions to register a first application with the primary node and the secondary node; and instructions to verify that the control message is associated with a registered application prior to executing the control command;

and wherein the computer readable medium further stores the registering instructions and the verifying instructions.

24. The computer program product of claim 19 wherein the control message is inserted into the replication update stream by an application.

* * * * *